July 24, 1962 P. A. LA FATA 3,045,637
VEHICLE ROOF MOUNTED SPEEDOMETER
Filed April 22, 1960

INVENTOR.
Peter A. LaFata
BY
William J. Ruano
ATTORNEY

United States Patent Office 3,045,637
Patented July 24, 1962

3,045,637
VEHICLE ROOF MOUNTED SPEEDOMETER
Peter A. La Fata, 16 Arlington St., Reading, Pa.
Filed Apr. 22, 1960, Ser. No. 24,162
1 Claim. (Cl. 116—57)

This invention relates to a speedometer and, more particularly, to a large speedometer for mounting on top of the roof of a vehicle, such as a police car, for viewing by drivers of other vehicles to enable them to check their speedometers for accuracy while trailing the police car at a substantially constant distance.

Statistics show that a very large percentage of speedometers used in vehicles are not accurate, therefore promoting unintentional violation of speed limits and resulting in unnecessary payments of fines. Drivers having such faulty speedometer calibrations will be made aware of this fact by the present invention and will be urged to have them repaired or recalibrated.

An outstanding disadvantage in using a large speedometer to serve as a speed check by others is the extreme difficulty involved in obtaining the proper calibration or recalibration in view of numerous variable factors such as the non-linearity in the relationship between the rotary movement of the pointer and the scale calibrations, the balance of the pointer, the specific drive mechanism involved etc.

An object of my invention is to provide a novel speedometer of large size, for mounting on a vehicle, which is devoid of the above named disadvantages and which is particularly useful for use on police cars for speed checking purposes.

A further object of my invention is to provide a novel speedometer construction which enables easy and quick calibration as well as recalibration of the speedometer to insure accuracy over the entire range of speed covered by the scale thereby.

A still further object of the invention is to provide an improved speedometer pointer of light weight and having easy adjustment for balance so as to eliminate errors otherwise introduced in indicating speed.

Other objects and advantages will become apparent from a study of the following description taken with the accompanying drawing wherein.

Figure 1:
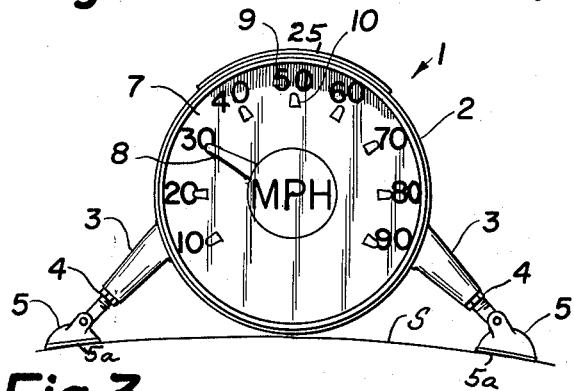
FIG. 1 is an elevational view of a large speedometer embodying the principles of the present invention and shown mounted on the roof of an automobile.
Figure 2:
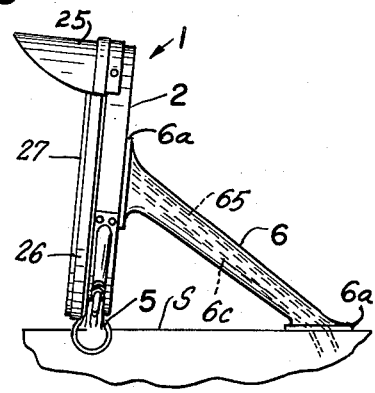
FIG. 2 is a side view of the speedometer shown in FIG. 1.

Referring more particularly to FIGS. 1 and 2 of the drawing, numeral 1 denotes, generally, a very large speedometer for mounting on the roof of an automobile, such as a police car, and which is several feet in diameter so as to be easily read by other motorists while driving behind the police car.

The mono-strut 6 of the fibre-glass or any other suitable material is fastened to the mounting surfaces, such as the car roof. The cable 6b and flexible shaft 6c for the speedometer and the multiple wires for the various colored lights run through this strut. Gaskets 6a are provided where the strut fastens to the mounting surface and to the case 2. Adjustable supports 3, 4, 5 of variable length are fastened to the case and bases 5 thereof are provided with gaskets 5a.

A speedometer face 7 which supports the calibrated mechanism is supported by the case. The case has a gasket 26 to provide proper sealing. A glass cover 27 with a gasket are arranged over the face and thus provide a sealed unit.

A shield 25 is provided to enhance the appearance of the unit and to shield the face from sunlight for better daytime visibility.

The glass cover, face 7 and case are sealed by means of a locking bezel (not shown) or clamping ring which securely clamps the parts together. The locking bezel is protected beneath the shield 25.

The speedometer calibration is such that, if necessary it can be adjusted without disassembly or removing the glass cover from the unit. The markers 10 are mounted so that they can be moved to the desired position by means of a tool inserted into the side of the case 2.

The purpose of the shield 25 over the top of the speedometer is to:

(A) Cover and protect from weather the lock mechanism which is an integral part of the clamping ring;
(B) Shade the face dial from mid-day sunlight; and
(C) Enhance the overall appearance of the speedometer, also giving the unit an official appearance.

The speedometer has a pointer 8 attached which indicates the speed. An identification disk or face 7 is provided which can be marked as desired, MPH, Police, etc.

In the calibration or in the recalibration of the present speedometer, the positions of the various markers or graduations 10 are adjustable or varied in position with respect to the pointer 8 at each separate calibration; whereas, in an ordinary speedometer the situation is opposite—the pointer varies and the markers are stationary and symmetrically or evenly spaced throughout the entire range of the dial.

In an ordinary speedometer, calibration creates a problem which involves tedious adjustments, removal of the instrument from the vehicle, disassembly, and in many cases new parts are needed. With the variable marker, the problem of calibration is eliminated. At the point of each calibration, the variable marker is simply moved to the corresponding position of the pointer. This simple adjustment completes the operation of calibration without tedious adjustments or removal of the instrument from the vehicle. Disassembly of the unit or replacement of parts generally are not required. In practice, the markers, after calibration, will not be evenly spaced throughout the entire scale, as one might expect, but will often be unevenly spaced due to many variable factors.

The face of the speedometer and the components of the variable marker can be made of any type of material and of any desired thickness, size and shape.

Figure 3:
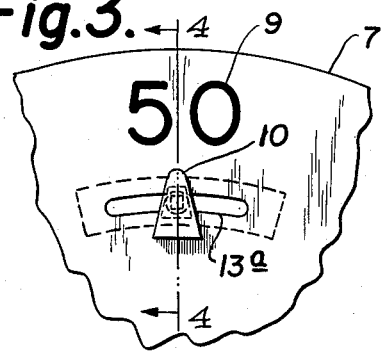
FIG. 3 is an enlarged, fragmentary view of a portion of the speedometer dial together with one of the markers or calibrations showing how it may be adjustably positioned.
Figure 4:
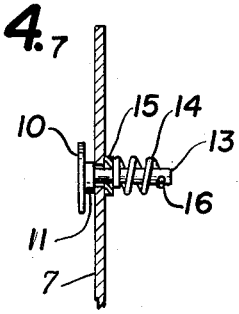
FIG. 4 is a vertical cross-sectional view taken along line 4—4 of the structure shown in FIG. 3; and, FIG. 5 is an enlarged, plan view of a modification of the speedometer pointer shown in FIG. 1.
Figure 5:
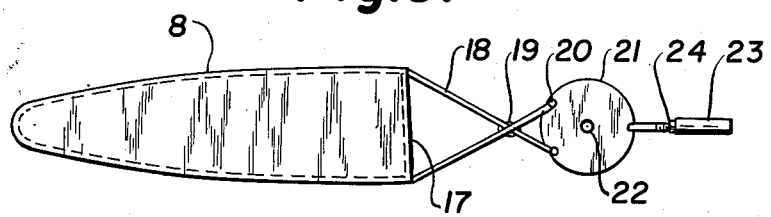

FIGS. 3 and 4 show one of the markers or calibrations 10 of FIG. 1, it being understood that the remaining markers are of the same adjustable construction.

Marker 10 is fastened to the marker mount 11. The stem 13 is then fastened perpendicular to the marker 10. This portion is inserted in the slot 13a on the face of the speedometer with the stem extending through and beyond the rear surface of the face of said speedometer. The backer 15 is added by placing the stem through the slot of the backer and extending the backer against the back side of the speedometer face.

A spring 14 or springing device is fitted over the stem and then locked in place by spring or screw-type action. FIG. 4 shows the spring 14 locked in place by inserting the end of the spring in the slot of the stem. The locked position of the spring creates a tension against the backer by compressing the marker mount and the backer against the face. This compression action holds the variable marker in any desired position within its limitations.

When an adjustment is needed, a tool is inserted to release the tension of the spring and the variable marker is moved to any desired position.

The speedometer includes a pointer assembly which is fabricated from spring steel wire 18 and soldered at 20 to a hub 21 which is fastened to the speedometer mechanism at the balance point 22.

A Mylar film 17 with an adhesive backing is applied to both sides of the wire frame 18.

The pointer may be painted any desired color on the front side. Attached to the hub at a point 180° from the wire pointer is a counter-weight 23. This weight is fastened by a threaded shaft to the hub. A locking nut 24 is on the shaft to lock the weight in a selected position after the pointer has been balanced.

Thus it will be seen that I have provided an efficient, large speedometer for mounting on police vehicles and the like to enable motorists to check the accuracy of their speedometer, which large speedometer, in spite of its size, can be calibrated so as to be extremely accurate and reliable and which can be easily and quickly recalibrated without disassembly of the speedometer.

While I have illustrated and described a single specific embodiment of my invention, it will be understood that this is by way of illustration only, and that various changes and modifications may be made within the contemplation of my invention and within the scope of the following claim.

I claim:

A large speedometer for mounting on the roof of a vehicle comprising a vertically mounted dial supported by legs mounted on the roof of the vehicle and having a plurality of substantially evenly spaced, separate arcuate slots disposed along an arc adjacent the periphery of the dial, a calibration marker assembly mounted on each slot including a marker slidably mounted on the outside face of the dial, a stud extending through the slot and a spring mounted on the stud and exerting frictional pressure on one surface of the dial to permit selective adjustment of the position of the marker within the limits of the length of the particular slot in which the marker assembly is mounted, and a pointer rotatably mounted for pivotal movement on the dial along said arc, and a flexible shaft extending from said speedometer and adapted to be connected to the drive of said vehicle so as to be driven thereby in direct proportion to the speed of said vehicle.

References Cited in the file of this patent

UNITED STATES PATENTS

| | | |
|---|---|---|
| 140,867 | Annin | July 15, 1873 |
| 989,742 | Wilkie | Apr. 18, 1911 |
| 2,575,720 | Lenehan | Nov. 20, 1951 |
| 2,584,958 | Williams | Feb. 5, 1952 |
| 2,761,415 | Waite | Sept. 4, 1956 |
| 2,793,607 | Brown | May 28, 1957 |
| 2,866,433 | Kallick | Dec. 30, 1958 |
| 2,907,297 | Zargarpur | Oct. 6, 1959 |
| 2,943,595 | Atwood | July 5, 1960 |

FOREIGN PATENTS

| | | |
|---|---|---|
| 814,353 | Great Britain | June 3, 1959 |